(12) United States Patent
Hahn

(10) Patent No.: US 8,019,172 B2
(45) Date of Patent: Sep. 13, 2011

(54) METHOD AND APPARATUS FOR INCREASING THE RESOLUTION OF A DATA SEQUENCE

(75) Inventor: Marko Hahn, Neubiberg (DE)

(73) Assignee: Trident Microsystems (Far East) Ltd., Grand Cayman (KY)

( * ) Notice: Subject to any disclaimer, the term of this patent is extended or adjusted under 35 U.S.C. 154(b) by 982 days.

(21) Appl. No.: 11/851,453

(22) Filed: Sep. 7, 2007

(65) Prior Publication Data

US 2008/0063352 A1 Mar. 13, 2008

(30) Foreign Application Priority Data

Sep. 8, 2006 (DE) .......................... 10 2006 042 180

(51) Int. Cl.
*G06K 9/40* (2006.01)
*H04N 9/70* (2006.01)

(52) U.S. Cl. ........ 382/254; 382/260; 382/261; 382/262; 382/263; 382/264; 386/300

(58) Field of Classification Search .......... 386/300–313; 382/254, 260–264
See application file for complete search history.

(56) References Cited

U.S. PATENT DOCUMENTS

| | | | | |
|---|---|---|---|---|
| 5,657,261 | A | 8/1997 | Wilson et al. | 364/724.1 |
| 5,880,767 | A * | 3/1999 | Liu | 347/251 |
| 6,958,783 | B2 * | 10/2005 | Alvarez | 348/618 |
| 7,916,964 | B2 * | 3/2011 | Fukuoka | 382/260 |
| 2005/0030424 | A1 | 2/2005 | De Haan et al. | |
| 2005/0220365 | A1 | 10/2005 | Hahn | |

FOREIGN PATENT DOCUMENTS

| | | | |
|---|---|---|---|
| EP | 1 164 568 A1 | 12/2001 | |
| EP | 1 587 319 A1 | 10/2005 | |
| JP | 01171062 | 7/1989 | 15/353 |

OTHER PUBLICATIONS

Gonzalez et al.: "Digital Image Processing", Second Edition, Prentice-Hall, 2002, p. 161-175.

* cited by examiner

*Primary Examiner* — Thai Tran
*Assistant Examiner* — Hung Q Dang
(74) *Attorney, Agent, or Firm* — DLA Piper LLP (US)

(57) ABSTRACT

The invention relates to a method and an apparatus for increasing the resolution of a data sequence, such as for example a video data sequence. Between two data values of a given data sequence at least one intermediate value is interpolated by applying low-pass filtering and at least one first and one second high-pass filterings to data values of the data sequence, subjecting the filter values obtained by the high-pass filterings to rank-order filtering and combining the filter result so obtained with the filter result obtained by low-pass filtering.

11 Claims, 4 Drawing Sheets

FIG. 1A
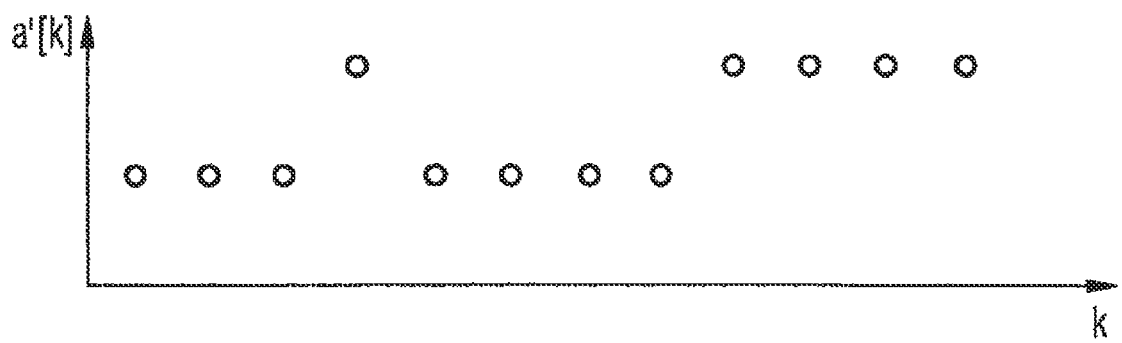
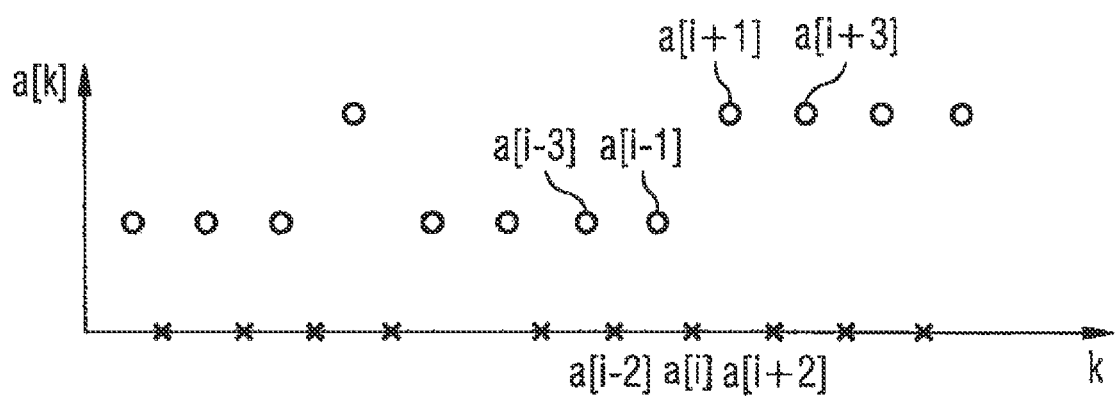
FIG. 1B

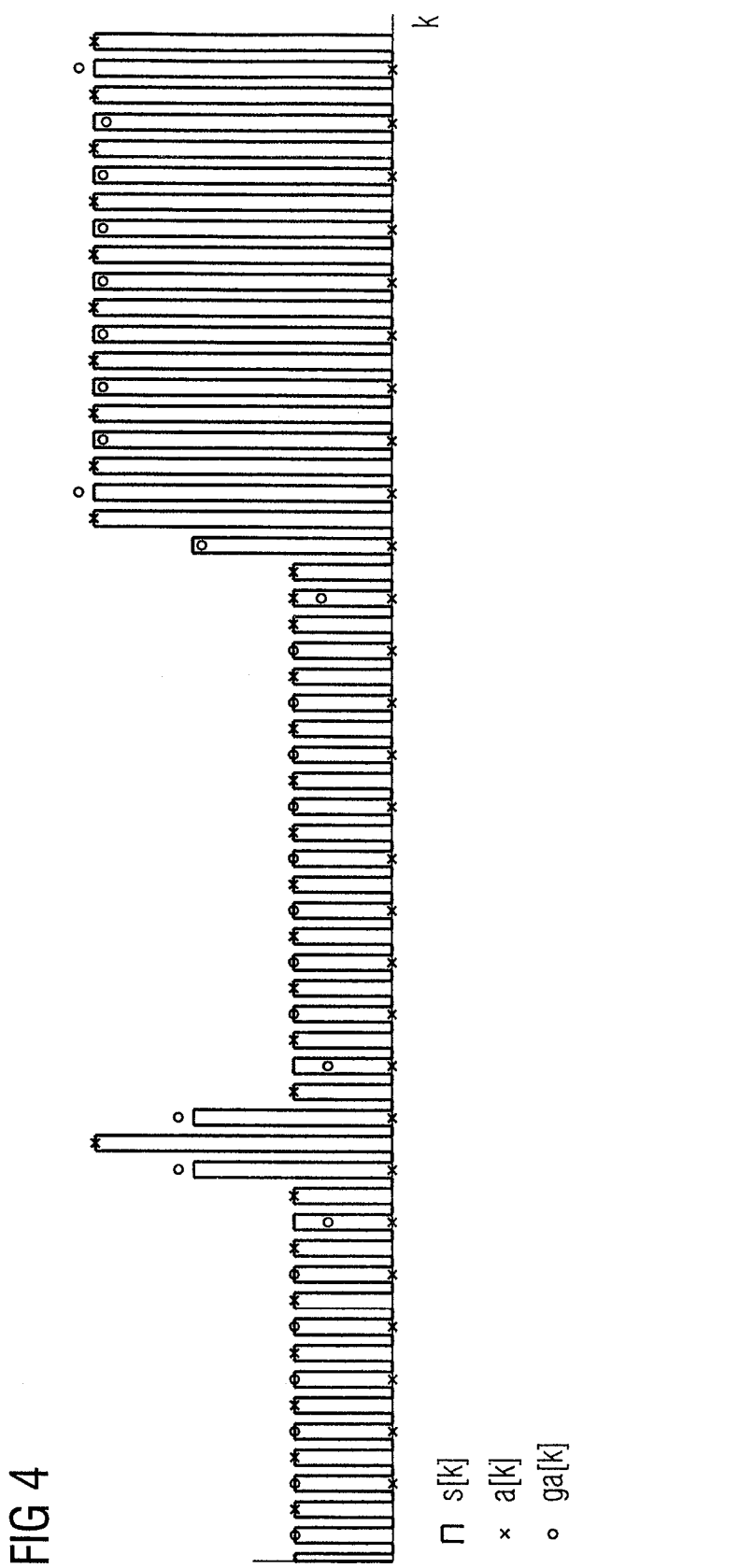

METHOD AND APPARATUS FOR INCREASING THE RESOLUTION OF A DATA SEQUENCE

PRIORITY INFORMATION

This patent application claims priority from German patent application 10 2006 042 180.9 filed Sep. 8, 2006, which is hereby incorporated by reference.

BACKGROUND OF THE INVENTION

The invention relates to increasing the resolution of a data sequence, an in particular to generating a second video data sequence from a first video data sequence, the second video data sequence having a higher resolution or a higher data rate than the first video data sequence.

Such a video data sequence of increased resolution can be generated for a given data sequence by interpolating intermediate values between consecutive data values of the given data sequence. Such interpolation of intermediate values can be applied in the case of data sequences having temporally consecutive data values and also in the case of data sequences having spatially consecutive data values. A data sequence having spatially consecutive data values occurs for example in digital video images in which pixels are arrayed in matrix fashion. The values of pixels disposed adjacent to one another in the vertical direction or in the horizontal direction of the image form, in each case, a data sequence having spatially consecutive data values, the data values being represented by the pixel values.

Interpolation of intermediate values between given pixel values is necessary for example in image processing when a frame comprising pixel values for all image lines of the image is to be generated from a field in which pixel values are present only for every second row of the pixel matrix. A data sequence whose resolution is to be increased is in this case a data sequence that comprises a sequence of pixel values associated with pixels disposed one above another in the vertical direction of the field.

Interpolation of intermediate values is also necessary in image processing when either the image resolution of an image section is to be magnified upon so-called zooming or the image resolution of the entire image is to be magnified.

Interpolation of such intermediate values in a given data sequence can be achieved for example by inserting at least one additional data value, for example zero, between every two consecutive data values of the given data sequence and then applying low-pass filtering to the sequence so obtained.

Conventional discrete low-pass filters have filter coefficients that are stated as sampled values of a function sinc(x) (where sinc(x)=sin(x)/x). The sinc(x) function is a function of infinite extent, while the discrete filter can have only a finite number of filter coefficients, and as a result low-pass filters implemented in this way do not display ideal filter behavior.

A filter that images signal discontinuities in the original data sequence onto the data sequence of increased resolution as nearly as possible without distortion is desirable for image processing. Such signal discontinuities in data sequences that result from a digital video image represent edges in the image at which there is either a discontinuous change in lightness or a discontinuous change in color. When conventional low-pass filters are employed, such signal discontinuities in the original data sequence result in overshoots and undershoots in the region of the signal discontinuity in the interpolated data sequence. Thus, in the region of the signal discontinuity, the interpolated data sequence receives data values that are smaller than the data values of the original data sequence and data values that are larger than the data values of the original data sequence. Such overshoots and undershoots in the region of image edges are usually perceived as unpleasant by the viewer.

Therefore, there is a need for a system and method of increasing the resolution of a video data sequence, which can be implemented in a relatively simple and economical fashion and that in particular images signal discontinuities in the original data sequence to signal discontinuities in the data sequence of increased resolution at least approximately without overshoots and undershoots.

SUMMARY OF THE INVENTION

According to an aspect of the invention, from a first data sequence having a sequence of data values, a second data sequence is generated having a higher resolution than the first data sequence. An intermediate sequence from the first data sequence is generated by inserting at least one specified intermediate value between every two consecutive data values of the first data sequence and the resultant intermediate sequence is filtered to generate the second data sequence.

The filtering may include low-pass filtering of at least two data values of the intermediate sequence, at least one of which comes before a given data value in the intermediate sequence and at least one of which comes after the given data value in the intermediate sequence. The filtering may also include first high-pass filtering that receives at least two data values of the intermediate sequence that come after the given data value in the intermediate sequence in order to prepare at least one first high-pass filter value. In addition, the filtering may include second high-pass filtering that receives at least two data values of the intermediate sequence that come before the given data value in the intermediate sequence in order to prepare at least one second high-pass filter value. Rank-order filtering is performed to at least the one first high-pass filter value and the at least one second high-pass filter value to provide a rank-order filter value. The low-pass filter value and the rank-order filter value are combined generate the data value of the second data sequence.

The rank-order filtering may receive a specified constant value, for example zero, in addition to the at least one first high-pass filter value and the at least one second high-pass filter value.

The rank-order filtering may include for example a median filtering that outputs the median of the values to be filtered. Rank-order filtering may, however, also be a maximum value or minimum value filtering that outputs the maximum value of the supplied values to be filtered or, respectively, the minimum value of the supplied values to be filtered.

A filter configuration for filtering a data sequence comprises a memory configuration for storing a first group having at least two data values that come before a first data value in the data sequence and for storing a second group of at least two data values that come after the first data value in the data sequence. The filter configuration further comprises a low-pass filter, which is supplied with at least one data value of the first group and with at least one data value of the second group and prepares a low-pass filter. At least one first high-pass filter, which is supplied with at least two data values of the first group, prepares at least one first high-pass filter value. At least one second high-pass filter, which is supplied with at least two data values of the second data group, prepares at least one second high-pass filter value. The filter configuration also comprises a rank-order filter, which is supplied with the at least one high-pass filter value and the at least one second high-pass filter value and prepares a rank-order filter value in dependence on these filter values, and a combining unit for combining the rank-order filter value with the low-pass filter and for preparing an output value of the filter configuration.

These and other objects, features and advantages of the present invention will become more apparent in light of the following detailed description of preferred embodiments thereof, as illustrated in the accompanying drawings.

BRIEF DESCRIPTION OF THE DRAWINGS

FIGS. 1A and 1B illustrate a data sequence having consecutive data values as well as an intermediate sequence generated from this data sequence by inserting constant intermediate values;

FIG. 4 illustrates, in a signal diagram, an initial data sequence, an intermediate sequence generated from the initial data sequence, and a signal sequence of increased resolution generated according to the processing technique of the present invention.

DETAILED DESCRIPTION OF THE INVENTION

FIG. 1A illustrates by way of example, a signal sequence a'[k] having a sequence of data values, which are plotted in FIG. 1A versus running index k. These data values may be temporally consecutive data values, and index k represents a temporal variable. The data values may however, also be spatially consecutive data values, and index k then represents a spatial variable. The spatially consecutive data values are for example pixel values, such as for example luminance values or chrominance values, of pixels of a video image constructed in matrix fashion.

From the data sequence a'[k], a data sequence having higher resolution or a higher data rate may be generated. To this end, with reference to FIG. 1A from the input data sequence a'[k] there is generated an intermediate sequence a[k], illustrated in FIG. 1B, comprising the data values of the input sequence a'[k] and at least one constant intermediate value between every two consecutive data values of the input sequence a'[k]. These intermediate values are for example zero and are shown by crosses in FIG. 1B. The circles in the time plot of the intermediate sequence a[k] symbolize the data values of the input sequence a'[k].

This intermediate sequence a[k] illustrated in FIG. 1B is filtered to generate a filtered signal sequence s[k], which exhibits interpolated intermediate values at least at the positions of the constant intermediate values of the intermediate sequence a[k].

Figure 2:
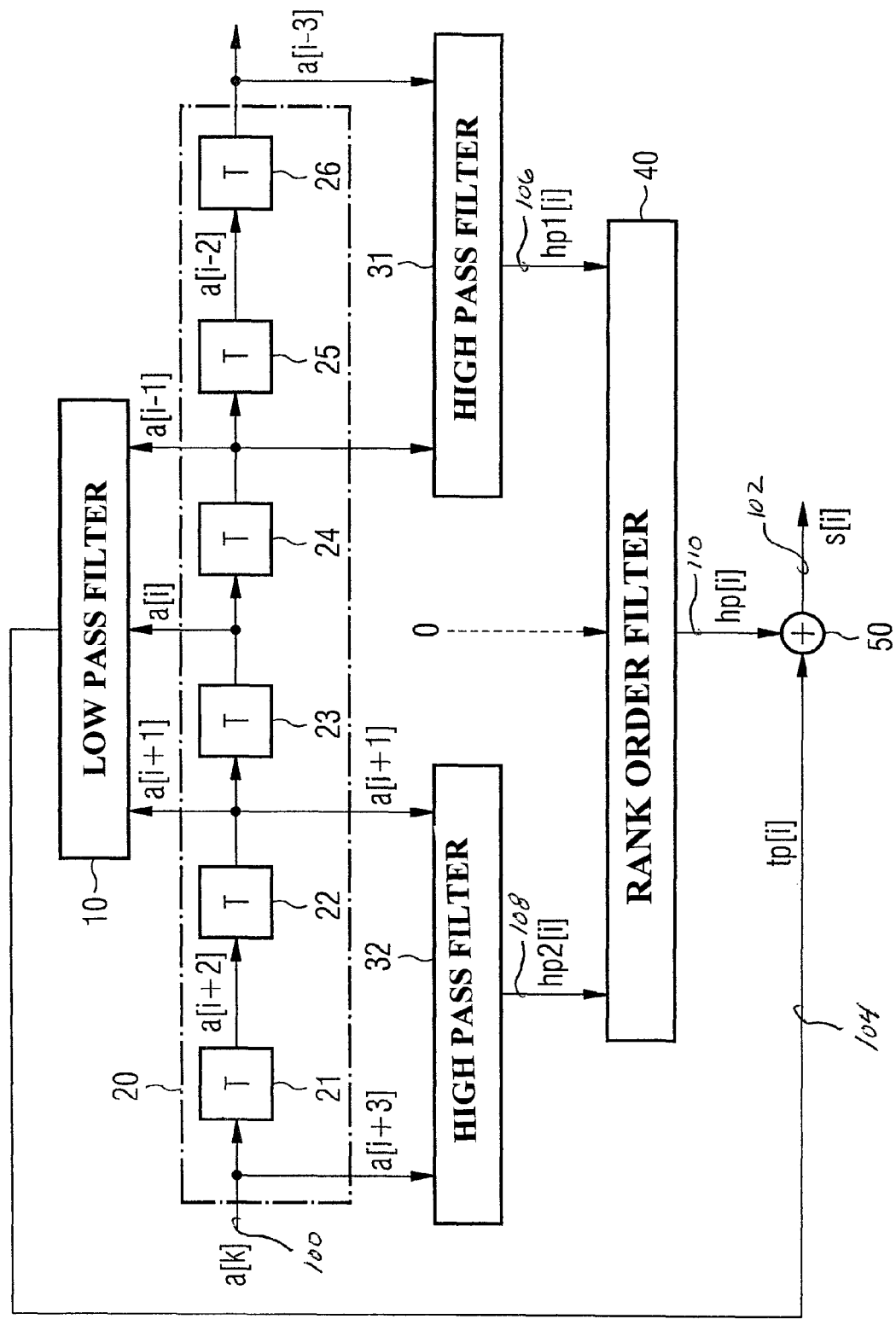
FIG. 2 is a block diagram illustration of a filter configuration according to an aspect of the invention.

FIG. 2 is a block diagram illustration of a filter configuration for filtering the intermediate sequence a[k] on line 100 to generate a filtered data sequence s[i] on line 102. The filter configuration comprises a memory 20 for storing a number of consecutive data values of the intermediate sequence a[k]. The memory 20 may comprise for example a shift register, which, with reference to FIG. 2, may be implemented with a sequence of clocked delay elements 21-26.

The memory 20 stores a number of consecutive data values of the data sequence a[k] to which filtering is applied. The memory 20 illustrated in the example comprises six delay elements 21-26 or storage elements so that, inclusive of a current data value of the data sequence a[k] present at the input of the memory 20, seven data values are available for filtering in the example illustrated. These data values are illustrated as a[i−3], . . . , a[i+3]. In FIG. 2, a[i] denotes a data value of the intermediate sequence a[k] for each of which, during a processing cycle of the filter configuration, there is generated the filtered signal value s[i] available at an output of the filter configuration on the line 102. The filter configuration illustrated in FIG. 2 processes the individual data values of the intermediate sequence a[k] consecutively, one filtered signal value s[i] being generated in each processing cycle for one data value a[i] of the intermediate sequence a[k]. The memory may be implemented as a FIFO memory so the stored data values are shifted one memory position after each processing cycle of the filter, so that for example the data value a[i−1] moves to the position of the data value a[i] and so forth. At the same time a new data value is stored in the memory 20 while one value, the one heretofore stored the longest, drops out of the memory.

The data value a[i], for which a filtered value s[i] is generated during one processing cycle of the filter configuration, is next designated the current value or given data value. The data values a[i−1], a[i−2], a[i−3], which were written into the memory 20 before the current data value a[i] and thus come before the current data value a[i] in the data sequence, form a first group of data values, while the data values a[i+1], a[i+2], a[i+3], which were written into the memory after the current data value a[i] and thus come after the current data value in the data sequence a[k], form a second group of data values. The relative position of the current data value a[i] in the intermediate sequence a[k] relative to the positions of the data values of the first and second groups is illustrated by way of example in FIG. 1B. On the assumption that variable k represents a temporal variable and that the data values are plotted in temporally ascending order from left to right, the data values of the first group lie to the right of the current data value a[i] in the signal plot, while the data values of the second group lie to the left of the current data value.

At least one data value of the first group, one data value of the second group and also, in the example, the current data value a[i] are subjected to low-pass filtering with a low-pass filter 10 to provide a low-pass filter value tp[i] on line 104. In the example, the data values of the first and second group subjected to low-pass filtering lie symmetrically to the current data value a[i] and in the example are data values a[i−1], a[i+1] that come immediately before and immediately after the current data value a[i] in the data sequence.

At least two data values of the first group are subjected to high-pass filtering with a first high-pass filter 31 to generate a first high-pass filter value hp1[i] on line 106, and at least two data values of the second group are subjected to high-pass filtering with a second high-pass filter 32 to generate a second high-pass filter value hp2[i] on line 108. The data values of the first group and of the second group each subjected to high-pass filtering are in each case symmetrical to the current data value a[i] in the data sequence. In the example illustrated, the data values subjected to high-pass filtering are in each case at odd-numbered positions relative to the position of current data value a[i]. Thus the data values a[i−1], a[i−3] of the first group subjected to high-pass filtering are in the first and third positions before the current data value a[i], while the data values a[i+1], a[i+3] of the second group subjected to high-pass filtering are in the first and third positions after the current data value a[i].

The first and second high-pass filter values hp1[i], hp2[i] on lines 106, 108 respectively are subjected to rank-order filtering with a rank-order filter 40. Optionally, besides both high-pass filter values hp1[i], hp2[i], a constant input value, for example zero, can be supplied to this rank-order filter and taken into account in filtering. The rank-order filter 40 is for example a median filter, a minimum filter or maximum filter and, from the input values supplied to it, hp1[i], zero and hp2[i] in the example, supplies a rank-order filter value hp[i] on line 110. The low-pass filter value tp[i] on line 104 and the rank-order filter value on line 110 hp[i] are combined, for example by an adder 50, to generate the filtered signal value s[i] on the line 102.

In one embodiment, the high-pass filters 31, 32 have equal filter coefficients and the data values of the first and second groups that are equidistant from the current data value a[i] are weighted in the same way in both the high-pass filters 31, 32 to generate the first and second high-pass filter values hp1[i], hp2[i]. These filter coefficients are so chosen that for example:

$$hp1[i] = \tfrac{1}{8} \cdot (a[i-1] - a[i-3]) \quad (1a)$$

$$hp2[i] = \tfrac{1}{8} \cdot (a[i+1] - a[i+3]). \quad (1b)$$

Here the data values a[i−1] and a[i+1], which are equidistant from the current data value a[i], are given a weight of ⅛, while data values a[i−3] and a[i+3], which are equidistant from the current data value a[i], are also given a weight of −⅛.

The low-pass filter value is described for example by:

$$tp[i] = \tfrac{1}{2} \cdot [2 \cdot a[i] + (a[i-1] + a[i+1])]. \quad (2)$$

Besides the relatively simple filter functions identified above, arbitrary high-pass filter functions and low-pass filter functions may be applied to implement the filtering according to the invention. High-pass filters are known to have the property that the sum of their filter coefficients is zero, while the sum of the filter coefficients of a low-pass filter is non-zero.

The filter coefficients for the low-pass filter 10 and both the high-pass filters 31, 32 may be derived from the filter coefficients of a discrete low-pass filter whose filter coefficients are sampled values of a function sinc(x). Consider for example a sixth-order low-pass filter having a transfer function:

$$G[z] = \tfrac{1}{16}[8z^{-3} + 5(z^{-2} + z^{-4}) - (z^0 + z^{-6})] \quad (3)$$

In application to a data sequence, for example the intermediate sequence a[k], a filter value generated by this low-pass filter is described by:

$$ga[i] = \tfrac{1}{8}[8a[i] + 5(a[i+1] + a[i-1]) - (a[i+3] + a[i-3])] \quad (4)$$

where a[i−3], . . . , a[i+3] symbolize data values of the data sequence a[k].

This temporal representation of the transfer function can be decomposed into a first high-pass component corresponding to equation (1a), which relates only to data values before the data value a[i], a second high-pass component corresponding to equation (1b), which relates only to data values after the data value a[i], and a low-pass component corresponding to equation (2).

High-pass filter functions of greater complexity can of course be applied; thus for example the first high-pass filter value hp1[i] generated by the first high-pass filter 31 and second high-pass filter value hp2[i] generated by the second high-pass filter 32 may be described by:

$$hp1[i] = \tfrac{1}{64} \cdot (7a[i-1] - 9a[i-3] + 2a[i-5]) \quad (5a)$$

$$hp2[i] = \tfrac{1}{64} \cdot (7a[i+1] - 9a[i+3] - 2a[i+5]). \quad (5b)$$

These first and second high-pass filterings described by equations (5a) and (5b) as well as the low-pass filtering corresponding to equation (2) can, in a fashion basically already explained, be derived from the discrete low-pass filter having:

$$G[z] = \tfrac{1}{128} \cdot [64z^{-5} + 39 \cdot (z^{-4} + z^{-6}) - 9 \cdot (z^{-2} + z^{-8}) + 2 \cdot (z^0 + z^{-10})] \quad (6)$$

as its transfer function.

Figure 3:
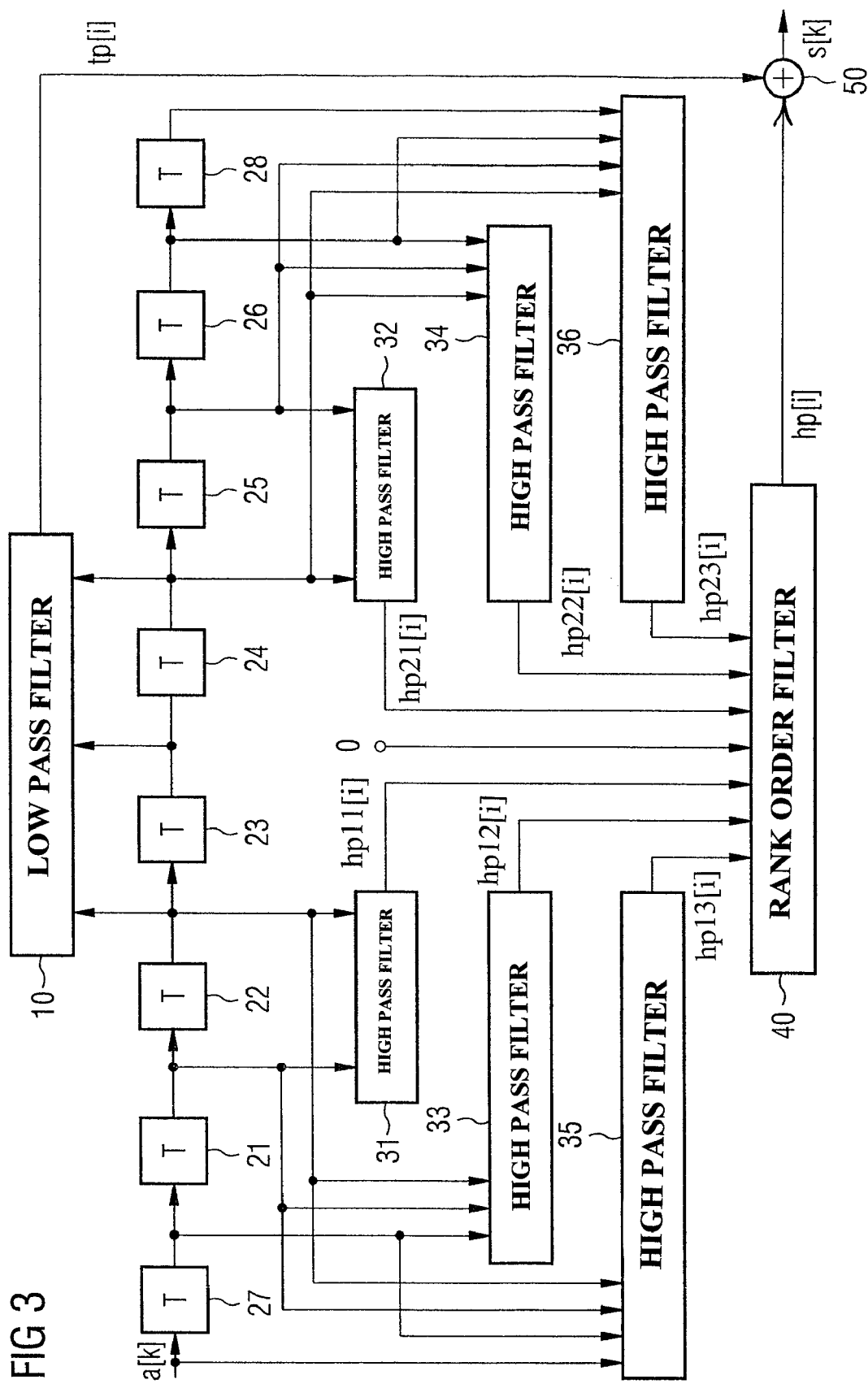
FIG. 3 is a block diagram illustration of an alternative embodiment filter configuration according to an aspect of the invention.

With reference to FIG. 3, in the filtering technique according to an aspect of the invention, it is also possible to subject the first and second groups of data values each to a plurality of high-pass filterings to obtain a plurality of first high-pass filter values hp11[i], hp12[i], hp13[i] and a plurality of second high-pass filter values hp21[i], hp22[i], hp23[i]. These high-pass filter values are subjected to rank-order filtering with a rank-order filter 40, an additional constant input value, for example zero, possibly being supplied to the rank-order filter. A rank-order filter value, which depends on the supplied first and second high-pass filter values and the constant input value if any, is available at the output of this rank-order filter. This rank-order filter value is combined with low-pass filter value tp[i], for example by addition.

In a fashion not described in greater detail, by way of example, two first high-pass filterings can be performed, of which one satisfies equation (1a) and the other satisfies equation (5a). Correspondingly, two second high-pass filterings can be performed, of which a first satisfies equation (1b) and another satisfies equation (5b).

In order to visualize the mode of functioning of the filtering, FIG. 4 illustrates an intermediate sequence a[k] and a filtered data sequence s[k] obtained from the intermediate sequence by the application of the method according to the invention. The filtering whose result is illustrated in FIG. 4 is based on low-pass filtering as described by equation (2) and two first and two second high-pass filterings as described by equations (1a), (1b), (5a) and (5b). Here rank-order filtering is applied to the four high-pass filter values obtained and the value zero as the fifth filter input value of the rank-order filter.

For comparison, FIG. 4 illustrates interpolated data values at the positions of the intermediate values of the intermediate sequence a[k], which are obtained by filtering of the intermediate sequence a[k] with the use of a discrete low-pass filter having a transfer function described by equation (6). Filtering with the discrete low-pass filter leads to overshoots, particularly in the region of the signal discontinuity of the intermediate sequence a[k] or of the original data sequence on which the intermediate sequence is based, which overshoots are avoided when employing the technique of the present invention.

Although the present invention has been illustrated and described with respect to several preferred embodiments thereof, various changes, omissions and additions to the form and detail thereof, may be made therein, without departing from the spirit and scope of the invention.

What is claimed is:

1. A method for generating, from a first data sequence of video data having a sequence of data values, a second data sequence of video data having a higher resolution than the first data sequence, the method comprising:
generating an intermediate sequence from the first data sequence (a'[k]) by inserting at least one specified intermediate value between every two consecutive data values of the first data sequence (a'[k]);
filtering the intermediate sequence (a[k]) to generate the second data sequence, this filtering exhibiting the following procedural steps in order to generate a data value (s[i]) of the second data sequence (s[k]), where the filtering comprises low-pass filtering at least two data values (a[i−1], a[i], a[i+1]) of the intermediate sequence (a[k]), at least one of which (a[i+1]) comes before a given data value (a[i]) in the intermediate sequence (a[k]) and at least one of which (a[i−1]) comes after the given data value in the intermediate sequence (a[k]), in order to prepare a low-pass filter value (tp[i]);

first high-pass filtering of at least two data values (a[i−1], (a[i−3]) of the intermediate sequence that come before the given data value in the intermediate sequence (a[k]) in order to prepare at least one first high-pass filter value (hp1[i]);

second high-pass filtering of at least two data values (a[i+1], (a[i+3]) of the intermediate sequence that come after the given data value in the intermediate sequence (a[k]) to prepare at least one second high-pass filter value (hp2[i]);

rank-order filtering at least to the at least one first high-pass filter value (hp1[i]) and the at least one second high-pass filter value (hp2[i]) to prepare a rank-order filter value (hp[i]); and combining the low-pass filter value (tp[i]) and the rank-order filter value to prepare the data value (s[i]) of the second data sequence, of higher resolution video data in comparison to the first data sequence.

2. The method of claim 1, where rank-order filtering is applied to the at least one first high-pass filter value (hp1[i]), the at least one second high-pass filter value (hp2[i]) and a specified constant value.

3. The method of claim 2, where the constant value is zero.

4. The method of claim 1, where the rank-order filtering is a median filtering.

5. The method of claim 1, where the at least two data values that are low pass filtered in step a) comprise the given data value.

6. The method of claim 1, where at least two first high-pass filterings and at least two second high-pass filterings are performed.

7. The method of claim 1, where the step of combining comprises summing the low-pass filter value and the rank order filter value.

8. The method of claim 1, where the procedural steps a) to e) are performed for all consecutive data values of the intermediate sequence (a[k]).

9. A filter configuration for filtering a video data sequence (a[k]), comprising:
  a memory for storing a first data value (a[i]) of the data sequence, for storing a first group having at least two data values (a[i+1], a[i+2], a[i+3]) that come before the first data value (a[i]) in the data sequence (a[k]) and for storing a second group of at least two data values (a[i−1], a[i−2], a[i−3]) that come after the first data value (a[i]) in the data sequence (a[k]);
  a low-pass filter that receives at least one data value of the first group and at least one data value of the second group and provides a low-pass filter value (tp[i]);
  at least one first high-pass filter that receives at least two data values of the first group and provides at least one first high-pass filter value (hp1[i]);
  at least one second high-pass filter that receives at least two data values of the second group and provides at least one second high-pass filter value (hp2[i]);
  a rank-order filter that receives the at least one first high-pass filter value (hp1[i]) and the at least one second high-pass filter value (hp2[i]) and provides a rank-order filter value in dependence on these filter values; and
  a combining unit that combines the rank-order filter value (hp[i]) with the low-pass filter value to provide an output video value (s[k]).

10. The filter configuration of claim 9, where the low-pass filter is supplied with the given data value.

11. The filter configuration of claim 9, where the rank-order filter receives a constant data value in addition to the at least one first high-pass filter value (hp1[i]) and the at least one second high-pass filter value (hp2[i]).

* * * * *